US011347713B2

(12) United States Patent
Cohen et al.

(10) Patent No.: US 11,347,713 B2
(45) Date of Patent: May 31, 2022

(54) VERSION-BASED TABLE LOCKING (71) Applicant: salesforce.com, inc., San Francisco, CA (US)

(72) Inventors: Jeffrey Ira Cohen, Sunnyvale, CA (US); Punit B. Shah, Castro Valley, CA (US); Serge Philippe Rielau, Alamo, CA (US)

(73) Assignee: salesforce.com, inc., San Francisco, CA (US)

( * ) Notice: Subject to any disclaimer, the term of this patent is extended or adjusted under 35 U.S.C. 154(b) by 311 days.

(21) Appl. No.: 16/585,191

(22) Filed: Sep. 27, 2019

(65) Prior Publication Data
US 2021/0097051 A1 Apr. 1, 2021

(51) Int. Cl.
*G06F 16/23* (2019.01)
*G06F 16/21* (2019.01)

(52) U.S. Cl.
CPC ........ *G06F 16/2343* (2019.01); *G06F 16/219* (2019.01); *G06F 16/2379* (2019.01)

(58) Field of Classification Search
CPC ........... Y10S 707/99954; G06F 16/219; G06F 16/2343; G06F 16/2379; G06F 16/2474
See application file for complete search history.

(56) References Cited

U.S. PATENT DOCUMENTS

| 5,706,506 | A | 1/1998 | Jensen et al. | |
|---|---|---|---|---|
| 6,606,626 | B1 | 8/2003 | Ponnekanti | |
| 7,028,057 | B1 * | 4/2006 | Vasudevan | G06F 16/2474 707/695 |
| 7,359,913 | B1 * | 4/2008 | Ordonez | G06F 16/285 |
| 7,548,918 | B2 * | 6/2009 | Jain | G06F 16/1774 |
| 7,933,881 | B2 * | 4/2011 | Richey | G06F 16/2329 707/704 |
| 8,209,696 | B2 | 6/2012 | Ferguson et al. | |
| 8,392,388 | B2 | 3/2013 | Pasupuleti et al. | |

(Continued)

FOREIGN PATENT DOCUMENTS

| EP | 0544517 A2 | 6/1993 |
|---|---|---|
| EP | 1612700 A2 | 1/2006 |
| WO | 2004013725 A2 | 2/2004 |

OTHER PUBLICATIONS

International Search Report and Written Opinion in PCT Appl. No PCT/US2020/050796 dated Dec. 7, 2020, 11 pages.

*Primary Examiner* — Merilyn P Nguyen
(74) *Attorney, Agent, or Firm* — Kowert, Hood, Munyon, Rankin & Goetzel, P.C.

(57) ABSTRACT

Techniques are disclosed relating to concurrently processing transactions. A computer system may maintain a database table having a plurality of versions. Each of the versions may identify a corresponding portion of the database table that transactions associated with that version are permitted to access. The computer system may receive a first request to perform a first transaction to modify a definition of the database table. The computer system may receive a second request to perform a second transaction to modify data stored in the database table. In response to determining that the first and second transactions are associated with different versions of the plurality of versions, the computer system may concurrently process the first and second transactions.

16 Claims, 9 Drawing Sheets

(56) References Cited

U.S. PATENT DOCUMENTS

| | | | |
|---|---|---|---|
| 8,521,965 B2* | 8/2013 | Saha | G06F 9/3834 |
| | | | 711/145 |
| 9,336,258 B2* | 5/2016 | Bhattacharjee | G06F 16/2343 |
| 10,585,876 B2* | 3/2020 | Brodt | G06F 16/2365 |
| 2007/0050391 A1* | 3/2007 | Chatterjee | G06F 16/284 |
| 2009/0037366 A1 | 2/2009 | Shankar et al. | |
| 2009/0077135 A1* | 3/2009 | Yalamanchi | G06F 16/2336 |
| 2015/0046413 A1* | 2/2015 | Andrei | G06F 16/2358 |
| | | | 707/695 |
| 2017/0277744 A1* | 9/2017 | Mohandas | G06F 16/2282 |
| 2018/0060373 A1* | 3/2018 | Foebel | G06F 16/275 |
| 2018/0322156 A1* | 11/2018 | Lee | G06F 16/2343 |

\* cited by examiner

VERSION-BASED TABLE LOCKING

BACKGROUND

Technical Field

This disclosure relates generally to version-based table locking.

Description of the Related Art

Modern database systems typically implement a management system that allows users to store a collection of information in an organized manner that can be efficiently accessed and manipulated. Such database systems often store that information in database tables composed of columns and rows in which each column defines a grouping of the information. For example, a company may wish to store information about their customers, such as their name, their email address, and their phone number. Accordingly, a database table can be created that includes a column for each piece of information (i.e., a column for names, a column for email addresses, and a column for phone numbers). When information is inserted into the database table, a new record (corresponding to a row of the database table) is added to the database table, where that record may provide information for each attribute/column of that database table.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some cases, database systems may process multiple transactions on a database table that are initiated by different applications. When processing a particular transaction, a database system often obtains a lock on the database table that allows the database system to manipulate data associated with the database table. Such a lock, however, can prevent the database system from processing another transaction while the initial transaction holds that lock. As a result, an application may be left waiting for a transaction to be processed that is being held up by another transaction that is holding a lock on the database table.

A database table may, in some cases, be associated with multiple versions, where each version presents a particular view of that database table. When a transaction is being processed, the database system may view data only from columns of the database table that correspond to the version associated with that transaction. The database system, however, may obtain a lock on the entire database table that prevents other transactions that are associated with the database table from being processed while the lock is held. The present inventors have recognized that this situation may be undesirable, as other transactions can be associated with different versions and, as a result, processing them may not conflict with the transaction that is holding the lock. As an example, consider a first transaction that is adding a database trigger to a future version of a database table that is not available to users—such a transaction may not affect users who are operating on an earlier version of the database table. In prior approaches, the first transaction might grab a global lock on the database table that prevents users from operating on the earlier version. Accordingly, the inventors have recognized that it may be desirable to permit certain transactions associated with different versions to be concurrently processed on the same database table.

The present disclosure describes various techniques for processing transactions that are associated with different versions of the same database table in a concurrent manner. As used herein, the phrase "in a concurrent manner" (or "concurrently"), when used in the context of processing transactions (or other work items), refers to processing two or more transactions in an overlapping manner, meaning that there exists a point in time or period of time in which the two or more transactions are being processed simultaneously. As an example, if a database system begins processing a first transaction and later starts processing a second transaction while the first transaction is still being processed, then the first and second transactions are said to be processed concurrently. But if the database system waits until the first transaction is processed before processing the second transaction, then the first and second transactions are not processed concurrently within the context of the present disclosure. Instead, such transactions are processed serially.

In various embodiments described below, a database system maintains a database table that has multiple versions, where each version may identify a corresponding portion (e.g., a set of fields) of that database table that transactions associated with that version are permitted to access and modify if applicable. The database system may further maintain, in various embodiments, a proxy table for each version of the database table. For a given transaction, the database system may obtain a lock on a certain proxy table to prevent other transitions having the same version from being processed while that proxy table is locked.

As an example, the database system may receive a request to perform a first transaction for modifying a definition of a database table. In various cases, the database system may obtain two locks for the first transaction. The database system may obtain a first lock on the database table—this lock may allow other transactions to interact with the database table, but may keep the underlying database table from being deleted. The database system may also acquire a second lock on a proxy table having the version of the first transaction—this second lock may prevent other transactions having the same version from being processed on the database table while that second lock is held. Thereafter, the database system may receive a request to perform a second transaction for modifying data that is stored in the database table. In a similar manner, the database system may attempt to obtain two locks: one on the database table and one on a proxy table that matches the version of the second transaction.

The database system may thus concurrently process the first and second transactions based on the transactions being associated with different versions of the same database table. But, in some cases, when attempting to obtain the second lock for the second transaction, the database system may not be able to obtain the second lock if the second transaction is associated with the same version as the first transaction, as the corresponding proxy table is locked by the first transaction. As a result, the database system may not process the first and second transactions concurrently as the transactions are associated with the same version. In various embodiments, the database system may further consider whether the first and second transactions might clash (i.e., manipulate the same data) because they involve the same "type" of database operation. That is, in some cases, database operations may clash—and thus cause data corruption—even when they are associated with different versions. For example, if two different-versioned database operations are operating on the same data row, their manipulation of that data row may corrupt the data in that data row. Accordingly, the database system may look at the "type" of the database operation—the types including data manipulation language (DML), data definition language (DDL), data control language (DCL) operations, and transaction control language (TCL) operations. Within the context of the present disclosure, two database operations are of "orthogonal types" if it is guaranteed—because of the nature of the operations—that executing the two operations will not corrupt data in the database if both operate correctly. For example, a DDL operation is an orthogonal type to a DML operation. If two database operations are associated with the same type of database operation, then the database system may choose to not process them concurrently.

These techniques may be advantageous over prior approaches as these techniques allow for multiple transactions associated with different versions of a database table to be processed concurrently against that database table. For example, in prior approaches, if a first transaction modifies a definition of a particular version of a database table (e.g., by adding a database trigger), then other transactions that modify a different portion of the database table (e.g., modified a data row) would be blocked until the first transaction was complete, even in cases where those transactions were associated with a different version. The techniques of the present disclosure, however, allow for the first transaction and the other transactions to be processed concurrently. A system for implementing these techniques will now be discussed below, starting with FIG. 1.

Figure 1:
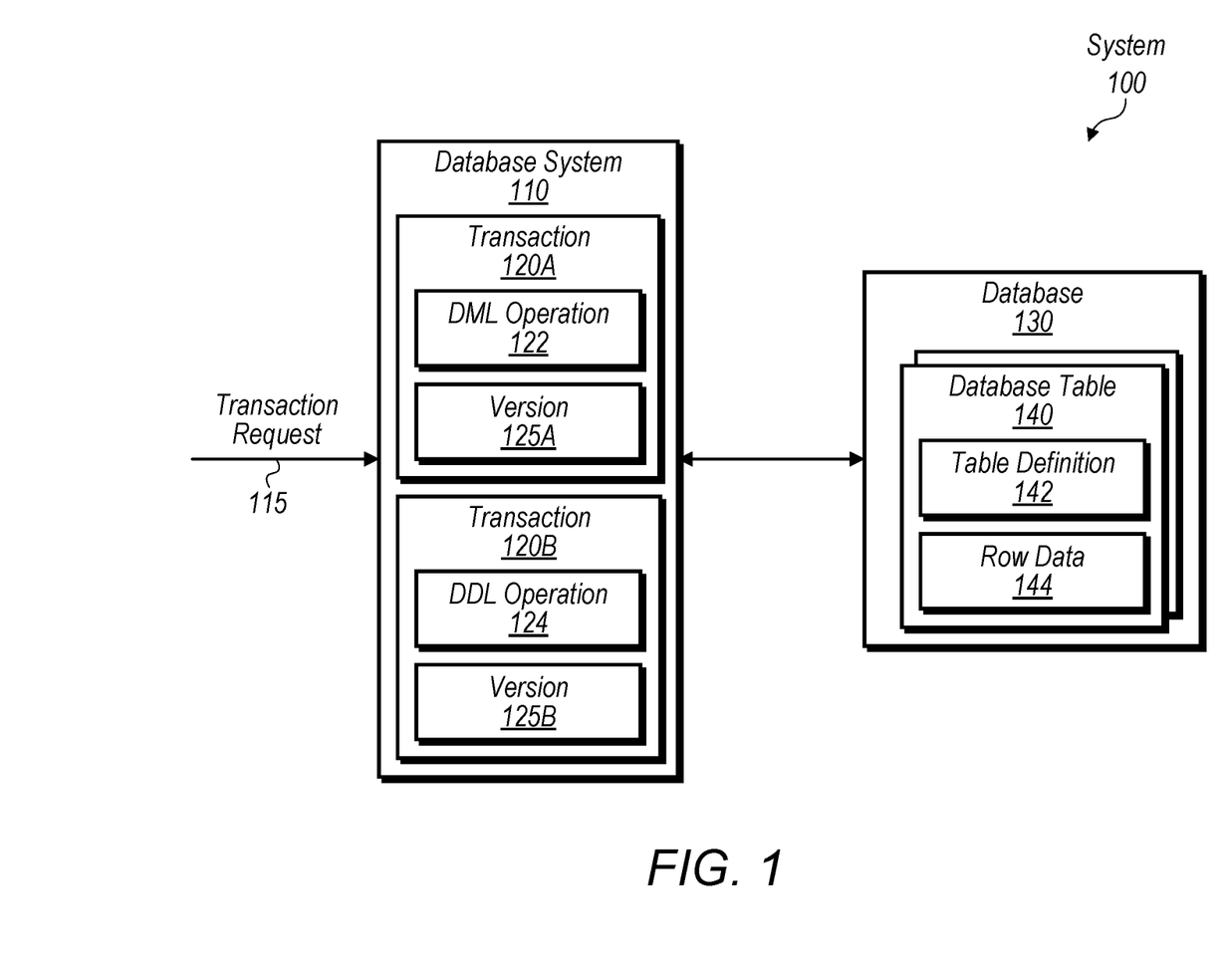
FIG. 1 is a block diagram illustrating example elements of a system capable of version-based table locking, according to some embodiments.

Turning now to FIG. 1, a block diagram of a system 100 is shown. System 100 is a set of components that are implemented via hardware or a combination of hardware and software routines. In the illustrated embodiment, system 100 includes a database system 110 (including transactions 120) and a database 130. As further illustrated, transaction 120A includes a data manipulation language (DML) operation 122 and a version 125A. Transaction 120B includes a data definition language (DDL) operation 124 and a version 125B. Also as shown, database 130 includes database tables 140 that have a table definition 142 and row data 144. In some embodiments, system 100 may be implemented differently than shown. For example, database system 110 may include database 130, system 100 may include multiple databases 130 and/or database systems 110, etc.

System 100, in various embodiments, implements a platform service that allows users of that service to develop, run, and manage applications. As an example, system 110 may be a multi-tenant system that provides various functionality to a plurality of users/tenants hosted by the multi-tenant system. Accordingly, system 100 may execute software routines from various, different users (e.g., providers and tenants of system 100) as well as provide code, forms, web pages, and other data to users of system 100, databases (e.g., database 130) of system 100, and other external entities that are associated with system 100. To handle the interactions between software applications and database 130, system 100 includes a database system 110.

Database system 110, in various embodiments, performs various operations to manage database 130, including data storage, data retrieval, and data manipulation. As such, database system 110 may provide database services to other systems that wish to interact with database 130. Such database services may include accessing and storing data maintained for a database table 140 of database 130. As an example, an application server may issue a transaction request 115 to database system 110 that includes a transaction 120 specifying that a particular database record be written to database 130 for a particular database table 140.

A transaction 120, in various embodiments, is a unit of work that specifies one or more operations/tasks to be performed to access and possibly modify the contents stored in database 130. A transaction 120 may specify different types of database operations, which include data manipulation language (DML) operations 122, data definition language (DDL) operations 124, data control language operations, and transaction control language operations. As depicted for example, transaction 120A specifies a DML operation 122. A DML operation 122, in various embodiments, is an operation that may access, insert, modify, and/or delete row data 144 stored in a database table 140. DML operations 122 may include SQL commands such as SELECT, INSERT, UPDATE, DELETE, MERGE, etc. A DDL operation 124, in various embodiments, is an operation that may modify a table definition 142 of a database table 140. DDL operations 124 may include SQL commands such as CREATE, ALTER, DROP, etc. A transaction 120, in various embodiments, specifies a version 125 of a database table 140 upon which a database operation (e.g., a DML operation 122) is to be performed. As explained further below, a version 125 may identify a corresponding portion of a database table 140 that transactions 120 that are associated with that version are permitted to access.

Database 130, in various embodiments, is a collection of information that is organized in a manner that allows for access, storage, and manipulation of that information. Accordingly, database 130 may include supporting software that allows for database system 110 to perform operations (e.g., accessing, storing, etc.) on information in database 130. Database 130 may be implemented by a single storage device or multiple storage devices that are connected together on a network (e.g., a storage attached network) and configured to redundantly store information in order to prevent data loss. In some embodiments, database 130 is implemented using a log-structured merge-tree (LSM tree) having multiple levels. One or more of the levels may include database records that are cached in an in-memory buffer prior to being written to the levels that are maintained on an on-disk storage medium. These database records may correspond to rows in a database table 140 and may be included in row data 144.

A database table 140, in various embodiments, is a collection of information, including data elements that are organized into a structured format having rows and columns. In various implementations, the columns may define subsets or fields of data within a database table 140 for which rows provide values. In some cases, a database table 140 may store data for multiple users/tenants. Accordingly, that database table 140 may include a column defining tenant as a subset of data under which each row of database table 140 specifies a tenant corresponding to that row of data. In various embodiments, the columns that are included in a database table 140 are specified in a table definition 142.

A table definition 142, in various embodiments, is a collection of information defining metadata associated with a database table 140, such as the structure of that database table (e.g., columns) and database triggers. When specifying a column for a corresponding database table 140, table definition 142 may specify a range of versions 125 associated with that column. As such, transactions 120 having a version 125 that falls within the range may have access to that column and its data; however, transactions 120 having a version 125 outside of that range may not know that the column exists. Thus, a column may be available in one or more versions 125 of a database table 140, but retired in some subsequent version 125.

A database trigger, in various embodiments, is a set of software routines executable to perform particular actions in response to certain events occurring on a particular database table 140. As an example, a database trigger might execute in response to the performance of a DML operation 122 (e.g., an INSERT). That database trigger might modify data belonging to another database table 140 based on the DML operation 122. In some cases, a database trigger may be associated with a version 125 that is specified in a table definition 142. Accordingly, a database trigger may execute based on the particular version 125 of the database table 140 that is being operated on for a transaction 120. A transaction 120 having a first version 125 may not trigger a database trigger having a second version 125 of the same database table 140. In some cases, since the shape of a database table 140 might be different depending on the version 125 (e.g., due to whether columns are visible), each version 125 of that database table may have its own corresponding set of database triggers specified in the appropriate table definition 142.

In various cases, when adding a version 125 to a database table 140, it may be desirable to define one or more database triggers for the new version 125. Accordingly, database system 110 may permit a transaction 120 that adds a database trigger to be executed concurrently with other transactions 120 if those other transactions affect a different version of the same database table 140. In various embodiments, if two transactions 120 involve different types of database operations (e.g., DML versus DDL) and different versions 125, then database system 110 may process those transactions concurrently; otherwise, the two transactions 120 may be processed in a serial manner. As explained further below, in various cases, database system 110 may use locking mechanisms to determine if a set of transactions 120 can be processed concurrently.

Figure 2:
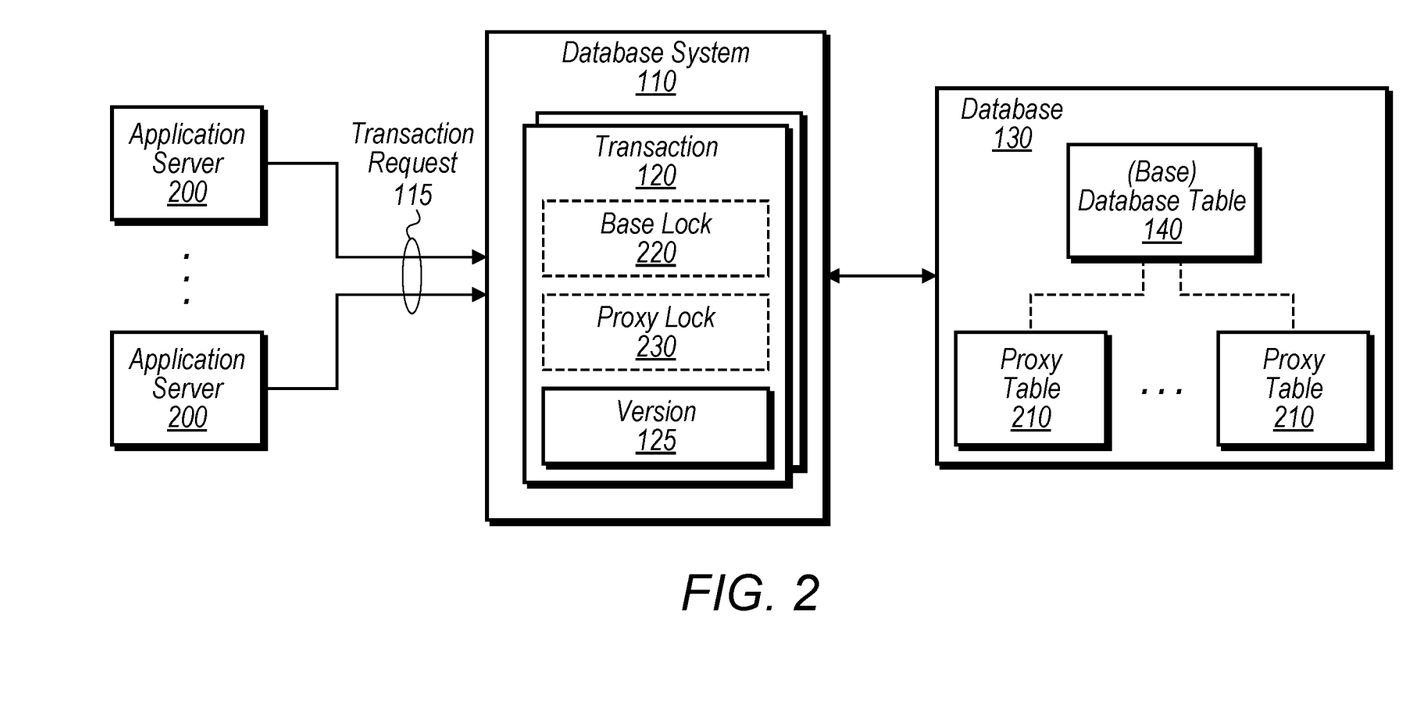
FIG. 2 is a block diagram illustrating example elements of a database that includes proxy tables, according to some embodiments.

Turning now to FIG. 2, a block diagram of a database system 110 and a database 130 is shown. The illustrated embodiment includes application servers 200, database system 110, and database 130. As further illustrated, database system 110 includes a transaction 120 having a version 125 and being associated with a base lock 220 and a proxy lock 230. Also as depicted, database 130 includes a base database table 140 and proxy tables 210. In some embodiments, the illustrated embodiment may be implemented differently than shown. As an example, rather than application servers 200, a different type of server may interact with database system 110, such as a web server.

An application server 200, in various embodiments, is a set of software routines that is executable to provide a server environment in which application programs can run. As shown, application servers 200 may interact with database system 110 by sending transaction requests 115 to database system 110. For example, a user who interfaces with an application server 200 through a user device may request data from database 130. Accordingly, that application server 200 may issue a transaction request 115 that specifies a transaction 120 to retrieve the requested data from database 130. In order to process transactions 120, database system 110 may interact with a base database table 140 and proxy tables 210.

A proxy table 210, in various embodiments, is a lockable database object corresponding to one or more versions 125 of a base database table 140. In some cases, a proxy table 210 may be a database table 140 having no row data 144 and a table definition 142 that does not specify columns and/or database triggers—that is, a proxy table 210 may be a database table 140 that exists as a reference point for the locking mechanism that is used by database system 110. As explained further below, when processing a transaction 120 to manipulate a database table 140, database system 110 may obtain a proxy lock 230 on a proxy table 210 that 1) has the same version 125 as the transaction 120 and 2) corresponds to the particular database table 140. When database system 110 attempts to process other transactions 120 having the same version 125, database system 110 will be unable to obtain a proxy lock 230 on the proxy table 210 while that first transaction 120 holds the lock. Accordingly, the other transactions 120 may not be able to operate on that database table 140 until the first transaction 120 releases its proxy lock 230.

Database system 110 may create or delete proxy tables 210 as changes are made to the corresponding database table 140 (and/or the schema for database 130). When a database table 140 is initially created, in various embodiments, database system 110 creates a proxy table 210 for the database table 140. As a database table 140 becomes associated with additional versions 125, database system 110 may create additional proxy tables 210—e.g., database system 110 may create a new proxy table 210 for each new version of that database table. When a database table 140 is deleted, database system 110 may delete all the proxy tables 210 corresponding to that database table.

As previously explained, in various embodiments, database system 110 may acquire at least two locks when processing a transaction 120: a base lock 220 and a proxy lock 230. These two locks may allow for transactions associated with different versions 125 to be concurrently processed while preventing transactions 120 that are associated with the same version 125 from being processed concurrently.

A base lock 220, in various embodiments, is a lock that can be acquired on a database table 140 for a transaction 120. In various cases, a base lock 220 may be a "weak" lock relative to proxy lock 230, which may be considered a "stronger" lock. There may be various degrees in lock strength where a weaker lock allows for more concurrent activity and a stronger lock allows for less concurrent activity. As a result, in some cases, the weakest lock may allow fully concurrent access while the strongest lock may obtain exclusive access (i.e., only the holder of the lock can access/modify a particular object (e.g., a table) while the strongest lock is held on that object). A base lock 220 may be a weaker lock (relative to proxy lock 230) that is used to keep a base database table 140 from being deleted while the corresponding transaction 120 operates on that database table; such a weaker lock may signify a transaction's 120 intention to operate on a base database table 140 as well. When a base lock 220 is acquired on a database table 140 as a weaker lock, other transactions 120 may also acquire base locks 220 on the same database table 140. In some cases, a base lock 220 may be a stronger lock that prevents other transactions from operating on a database table 140. A strong base lock 220 may be acquired, for example, in cases where a transaction 120 is unversioned. In various embodiments, a base lock 220 may be released for a transaction 120 after that transaction 120 has completed or has been rolled back by database system 110. While base locks 220 are discussed as locking at the table level, the techniques discussed herein can be extended to other levels (e.g., database level, file level, page level, row level, etc.).

A proxy lock 230, in various embodiments, is a lock that can be acquired on a proxy table 210 for a transaction 120. In various cases, a proxy lock 230 may be acquired as a strong lock that prevents other transactions 120 from acquiring their own proxy lock 230 on the same proxy table 210. While a proxy lock 230 is held for a certain transaction 120, database system 110 may perform database operations on portions of the corresponding database table 140 that are associated with the same version 125. Other transactions 120 that desire to operate on the same version 125 of the database table 140 may be postponed until the proxy lock 230 held by another transaction 120 is released. In various embodiments, a proxy lock 230 may be released for a transaction 120 after that transaction has completed or has been rolled back by database system 110.

Figure 3:
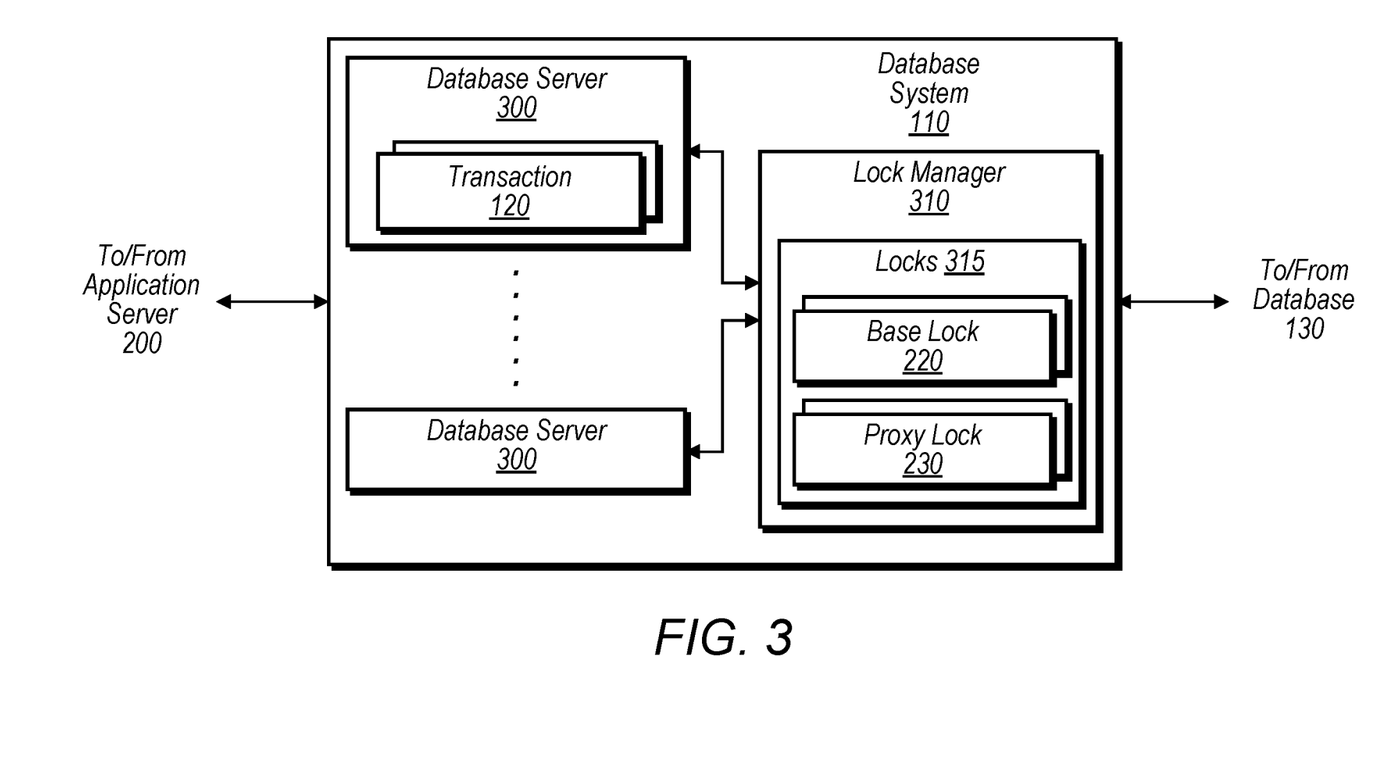
FIG. 3 is a block diagram illustrating example elements of a database system, according to some embodiments.

Turning now to FIG. 3, a block diagram of a database system 110 is shown. In the illustrated embodiment, database system 110 includes database servers 300 and a lock manager 310. Also as illustrated, database servers 300 include transactions 120, and lock manager 310 includes locks 315 having base locks 220 and proxy locks 230. In some embodiments, database system 110 may be implemented differently than shown. As an example, database system 110 may not include lock manager 310; instead, lock manager 310 may be an external component.

A database server 300, in various embodiments, is a set of software routines executable to performs various operations to manage database 130, including data analysis, data storage, data retrieval, and data manipulation. A database server 300 may receive transactions requests 115 from application servers 200 and other entities of system 100 (e.g., other servers). In order to process transactions 120 that are identified in those transaction requests, database server 300 may communicate with lock manager 310 to acquire one or more locks 315. As an example, a database server 300 may obtain a base lock 220 and a proxy lock 230 for a transaction 120 that specifies a version 125.

Lock manager 310, in various embodiments, is a set of software routines executable to manage locks 315 on behalf of one or more database servers 300. When a database server 300 wishes to perform one or more database operations specified in a transaction 120, the database server may communicate with lock manager 310 to obtain locks 315 (e.g., a base lock 220 and a proxy lock 230). Lock manager 310 may determine whether a lock 315 can be allocated for a particular transaction 120. For example, lock manager 310 may determine whether a proxy lock 230 has already been allocated for another transaction 120. If a proxy lock 230 has been allocated, then one may not be allocated for the particular transaction 120; however, if a proxy lock 230 has not been allocated, then one may be allocated.

Figure 4:
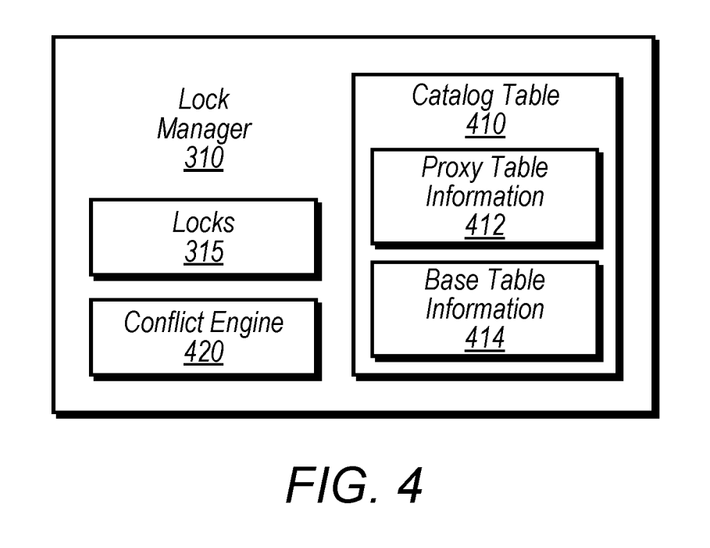
FIG. 4 is a block diagram illustrating example elements of a lock manager, according to some embodiments.

Turning now to FIG. 4, a block diagram of a lock manager 310 is shown. In the illustrated embodiment, lock manager 310 includes locks 315, a catalog table 410 and a conflict engine 420. As further illustrated, catalog table 410 includes proxy table information 412 and base table information 414.

In some embodiments, lock manager 310 may be implemented differently than shown. As an example, lock manager 310 may include multiple catalog tables 410.

Catalog table 410, in various embodiments, is a collection of information that identifies base database tables 140, proxy tables 210, and relationships between those tables. Proxy table information 412, in various embodiments, specifies proxy tables 210 that have been allocated and identifies, for each of those proxy tables, the corresponding database table 140 along with the corresponding version 125. Base table information 414, in various embodiments, specifies database tables 140 that have been allocated. Information maintained in catalog table 410 may be passed to conflict engine 420 to assist conflict engine 420 in determining whether there is a lock conflict.

Conflict engine 420, in various embodiments, is a set of software routines executable to allocate locks 315 and determine whether there is a lock conflict when attempting to allocate a lock 315. In response to receiving a request to allocate a base lock 220 on a particular base database table 140 for a transaction 120, conflict engine 420 may determine if a base lock 220 has already been allocated on the particular base database table 140. In various cases, conflict engine 420 may search through locks 315 to determine whether that base lock 220 has already been allocated. If no base lock 220 has been allocated or if there are only weak base locks 220 allocated for the particular database table 140, then conflict engine 420 may allocate a base lock 220 for the transaction 120; otherwise, conflict engine 420 may indicate that a base lock 220 cannot be allocated until a particular, current base lock 220 is released.

In response to receiving a request to allocate a proxy lock 230 on a particular proxy table 210 for a transaction 120, conflict engine 420 may determine if a proxy lock 230 has already been allocated on that particular proxy table 210. In various cases, conflict engine 420 may search through locks 315 to determine whether that proxy lock 220 has already been allocated. If no proxy lock 220 has been allocated on the particular proxy table 210, then conflict engine 420 may allocate a proxy lock 230 for the transaction 120; otherwise, conflict engine 420 may indicate that a proxy lock 230 cannot be allocated until a particular, current proxy lock 230 is released.

Figure 5:
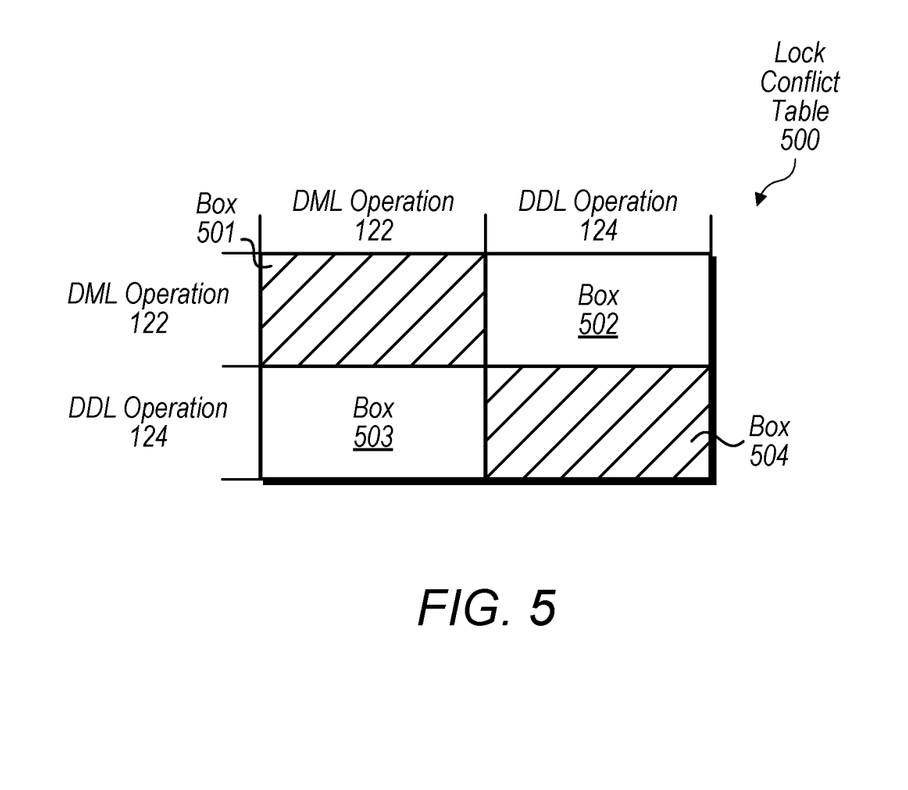
FIG. 5 is a block diagram illustrating example elements of a lock conflict table, according to some embodiments.

Turning now to FIG. 5, a block diagram of a lock conflict table 500 is depicted. In the illustrated embodiment, lock conflict table 500 includes four boxes: a box 501 that corresponds to two DML operations 122; a box 502 that corresponds to a DML operation 122 and a DDL operation 124; a box 503 that corresponds to a DML operation 122 and a DDL operation 124; and a box 504 that corresponds to two DDL operations 124. Boxes 501 and 504 are illustrated with stripes to indicate a lock conflict that occurs independent of version 125.

As shown, two DML operations 122 conflict with each other and two DDL operations 124 conflict with each other as well. In various cases, these conflicts may occur independent of the particular versions 125 associated with those operations. Accordingly, in some cases, if database system 110 receives two transactions 120 that each specify the same type of database operation (e.g., DML operations 122 or DDL operations 124), then database system 110 may not concurrently process those transactions, even in cases where the transactions are associated with different versions 125. As shown by boxes 502 and 503, a DML operation 122 and a DDL operation 124 do not conflict—they man conflict in cases where version 125 is considered. If database system 110 receives two transactions 120 that each specify a different type of database operation and are associated with different versions 125, then database system 110 may process those transactions concurrently.

Figure 6:
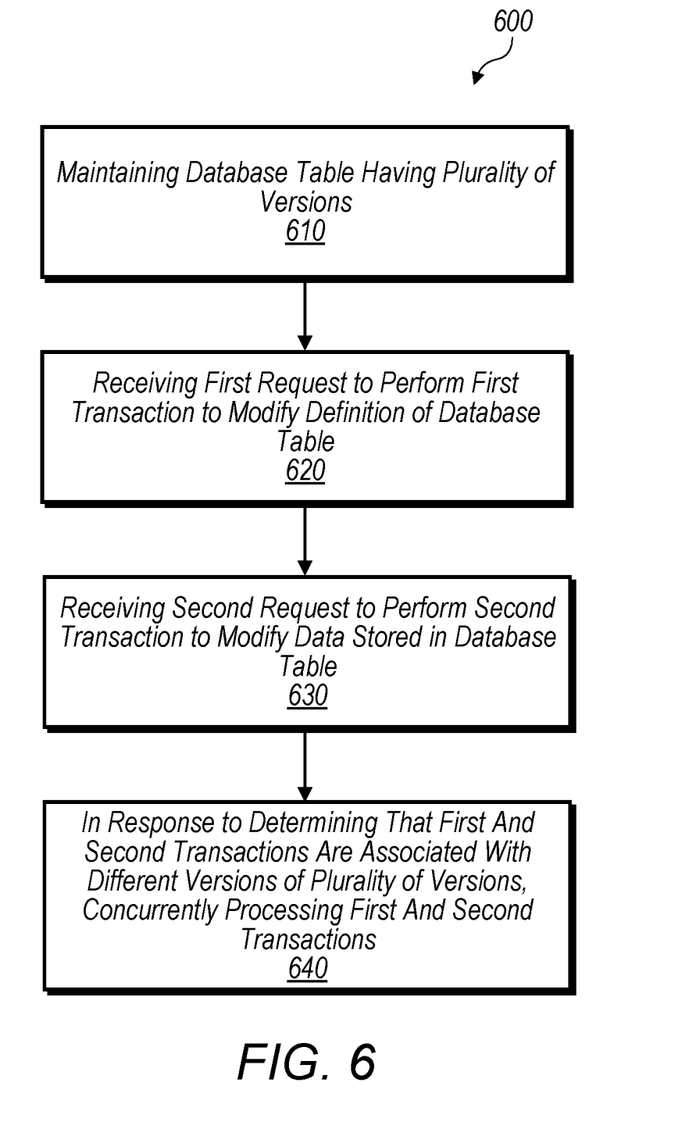
FIGS. 6-8 are flow diagrams illustrating example methods relating to processing transactions, according to some embodiments.

Turning now to FIG. 6, a flow diagram of a method 600 is shown. Method 600 is one embodiment of a method performed by a computer system (e.g., database system 110) in order to process transactions (e.g., transactions 120). In some embodiments, method 600 may include more or less steps than shown. For example, the computer system may modify a definition (e.g., table definition 142) of a database table (e.g., database table 140) to add a database trigger to be executed upon a particular condition being satisfied (e.g., in response to data being inserted into the database table).

Method 600 begins in step 610 with the computer system maintaining a database table having a plurality of versions (e.g., versions 125). In various embodiments, each of the versions identifies a corresponding portion (e.g., fields) of the database table that transactions associated with that version are permitted to access. The computer system may maintain a proxy table (e.g., proxy table 210) for each of the plurality of versions of the database table. The proxy table may permit a proxy lock (e.g., proxy lock 230) to be acquired on the proxy table for a given transaction (e.g., transaction 120). While the proxy lock is held for the given transaction, the computer system may be prevented from processing another transaction on the database table that is associated with a version corresponding to the proxy table.

In response to the determining that the database table is associated with a new version, the computer system may create a new proxy table for the new version of the database table. In response to the database table being deleted, the computer system may delete each proxy table maintained for the plurality of versions of the database table.

In step 620, the computer system receives a first request (e.g., transaction request 115) to perform a first transaction (e.g., transaction 120) to modify a definition of the database table. In some instances, the first transaction may specify a data definition language (DDL) operation (e.g., DDL operation 124) for modifying the definition of the database table.

In step 630, the computer system receives a second request (e.g., transaction request 115) to perform a second transaction (e.g., transaction 120) to modify data that is stored in the database table. In some instances, the second transaction may specify a data manipulation language (DML) operation (e.g., DML operation 122) for modifying data stored in the database table.

In step 640, in response to determining that the first and second transactions are associated with different versions of the plurality of versions, the computer system concurrently processes the first and second transactions. In some cases, the computer system may receive a third request to perform a third transaction that specifies a second DDL operation for modifying the definition of the database table. The computer system may sequentially process the first and third transactions based on the first and third transactions each specifying a DDL operation. The first and third transactions may be associated with different version of the plurality of versions. In some cases, the computer system may receive a third request to perform a third transaction that specifies a second DML operation for modifying data stored in the database table. The computer system may sequentially process the first and third transactions based on the first and third transactions each specifying a DML operation. The first and third transactions may be associated with different version of the plurality of versions.

In some embodiments, the computer system acquires, for the first transaction, a first lock (e.g., a base lock 220) on the database table and a second lock (e.g., a proxy lock 230) on a particular proxy table that corresponds to a version that is associated with the first transaction. The first lock may permit the computer system to process, while the first lock is held for the first transaction, the second transaction to modify data stored in the database table. The second lock may prevent the computer system from processing, while the second lock is held for the first transaction, another transaction on the database table that is associated with the version of the first transaction. In some cases, the first lock is acquired prior to the second lock; in other cases, the second lock is acquired prior to the first lock.

Figure 7:
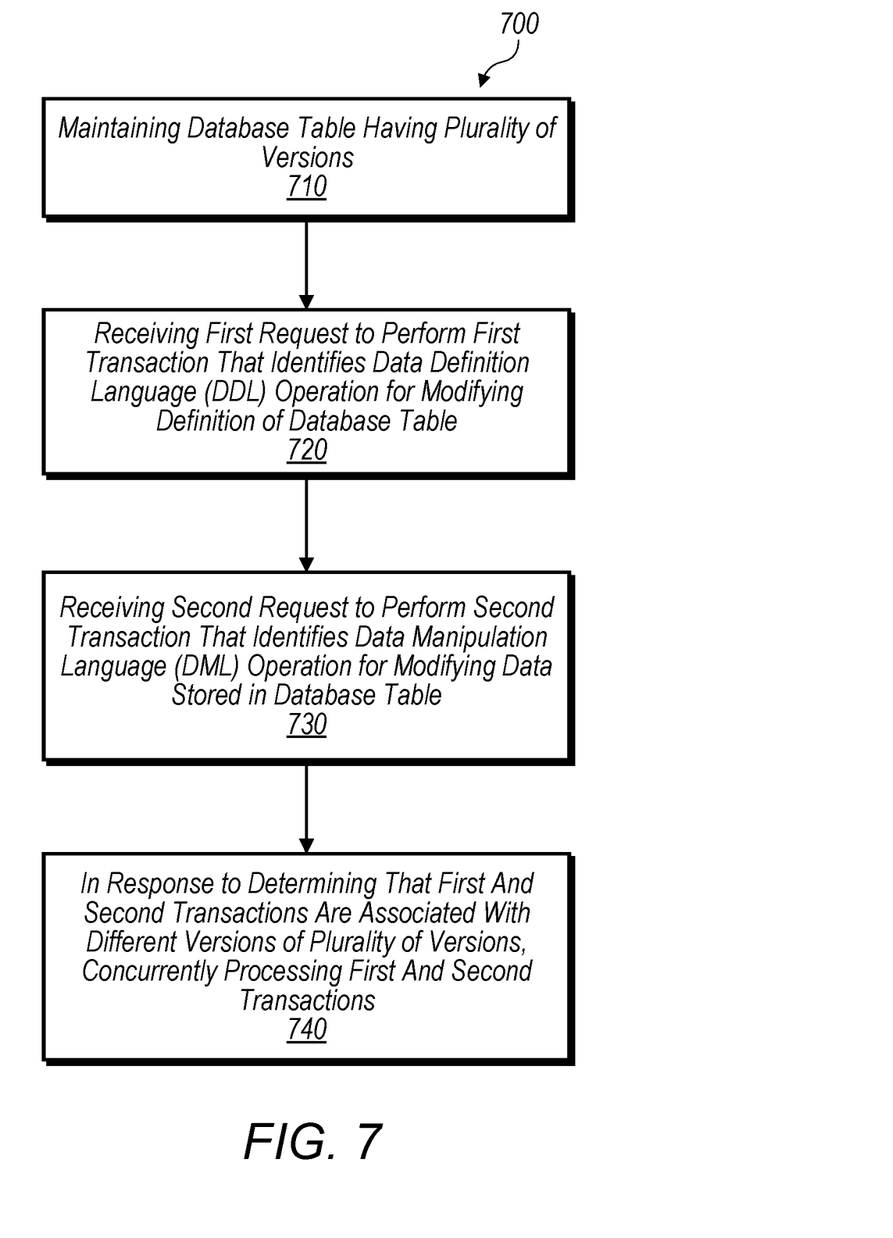

Turning now to FIG. 7, a flow diagram of a method 700 is shown. Method 700 is one embodiment of a method performed by a computer system (e.g., database system 110) in order to process transactions (e.g., transactions 120). Method 700 may be performed by executing a set of program instructions stored on a non-transitory computer-readable medium. In some embodiments, method 700 may include more or less steps than shown. For example, the computer system may modify a definition (e.g., table definition 142) of a database table (e.g., database table 140) to add a database trigger to be executed upon a particular condition being satisfied (e.g., in response to data being inserted into the database table).

Method 700 begins in step 710 with the computer system maintaining a database table (e.g., database table 140) having a plurality of versions (e.g., versions 125). In various cases, each of the versions may identify a corresponding portion of the database table that transactions associated with that version are permitted to access. For example, a set of fields of the database table that are associated with a particular version may be accessible to a transaction having the same particular version.

In step 720, the computer system receives a first request (e.g., a transaction request 115) to perform a first transaction that identifies a data definition language (DDL) operation (e.g., DDL operation 124) for modifying a definition (e.g., a table definition 142) of the database table. The first transaction may be associated with a first version of plurality of versions In step 730, the computer system receives a second request (e.g., a transaction request 115) to perform a second transaction that identifies a data manipulation language (DML) (e.g., DML operation 122) operation for modifying data (e.g., row data 144) stored in the database table. The second transaction may be associated with a second, different version (than the first version) of the plurality of versions.

In various embodiments, the computer system maintains a plurality of lockable objects (e.g., proxy tables 210) that respectively correspond to the plurality of versions. A given lockable object may permit a lock (e.g., a proxy lock 230) to be acquired on the given lockable object for a given transaction. In various cases, while the lock is held for the given transaction, the computer system may be prevented from processing another transaction that involves the database table that is associated with a version corresponding to the given lockable object. In processing the first transaction, the computer system may acquire, for the first transaction, a first lock (e.g., a proxy lock 230) on a first particular one of the plurality of lockable objects that corresponds to the first version. In processing the second transaction, the computer system may acquire, for the second transaction, a second lock (e.g., a proxy lock 230) on a second particular one of the plurality of lockable objects that corresponds to the second version.

In step 740, in response to determining that the first and second transactions are associated with different versions of the plurality of versions, the computer system concurrently processes the first and second transactions. The concurrent processing of the first and second transactions may be performed in response to further determining that the first and second transactions are associated with different types of database operations (e.g., one is associated with a DML operation 122 while the other is associated with a DDL operation 124).

Prior to completing the processing of the first and second transactions, the computer system may receive a third request to perform a third transaction that is associated with the first version. The computer system may process the third transaction subsequent to the first lock being released.

Figure 8:
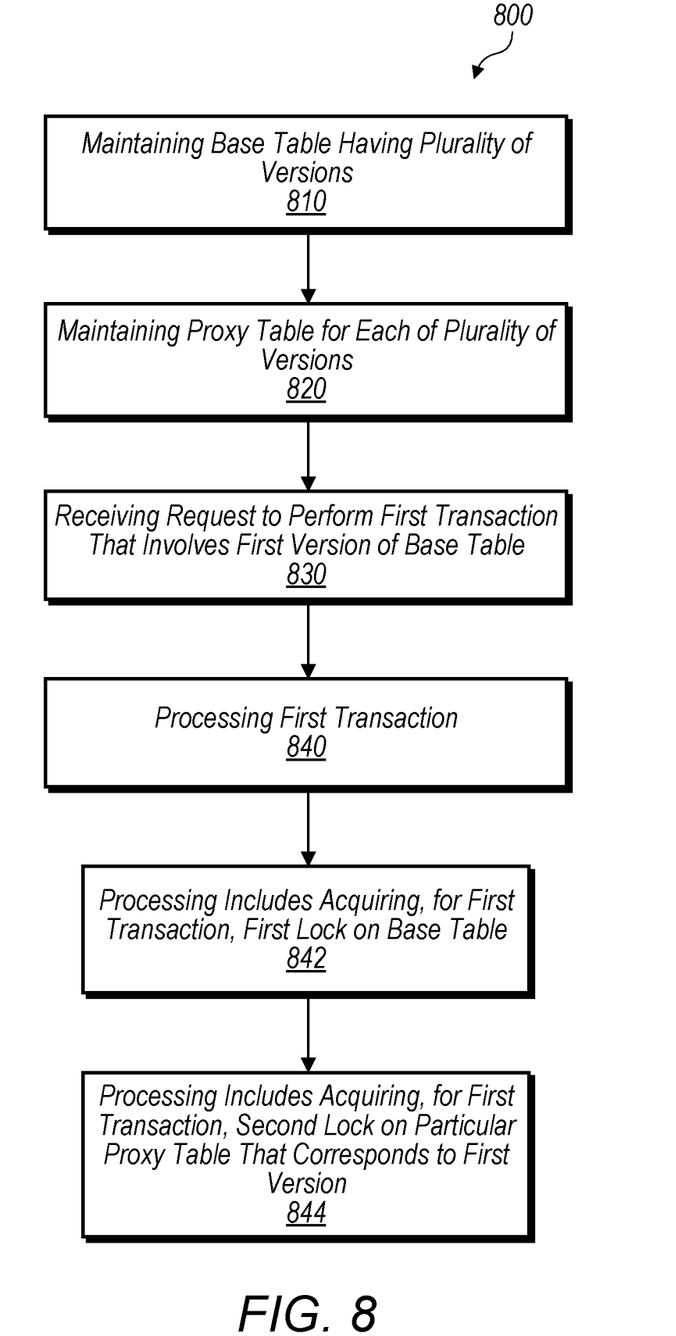

Turning now to FIG. 8, a flow diagram of a method 800 is shown. Method 800 is one embodiment of a method performed by a computer system (e.g., database system 110) in order to process transactions (e.g., transactions 120). In some embodiments, method 800 may include more or less steps than shown. For example, the computer system may modify a definition (e.g., table definition 142) of a database table (e.g., database table 140) to add a database trigger to be executed upon a particular condition being satisfied (e.g., in response to data being inserted into the database table).

Method 800 begins in step 810 with the computer system maintaining a base table (e.g., database table 140) having a plurality of versions (e.g., versions 125). Each of the versions may identify a corresponding portion (e.g., fields) of the base table that transactions associated with that version are permitted to access.

In step 820, the computer system maintain a proxy table (e.g., proxy table 210) for each of the plurality of versions.

In step 830, the computer system receives a request (e.g., transaction request 115) to perform a first transaction (e.g., transaction 120) that involves a first version of the base table. The first version may identify one or more fields of the base table that are not identified by a second version of the plurality of versions.

In step 840, the computer system processes the first transaction. In step 842, as part of the processing, the computer system acquires, for the first transaction, a first lock (e.g., base lock 220) on the base table. The first lock may permit the computer system to process, while the first lock is held for the first transaction, another transaction to manipulate a portion of the base table associated with a different version than the first version. In step 844, as part of the processing, the computer system acquires, for the first transaction, a second lock (e.g., proxy lock 230) on a particular proxy table that corresponds to the first version. The second lock may prevent the computer system from processing, while the second lock is held for the first transaction, another transaction to manipulate a portion of the base table associated with the first version.

In some cases, the computer system receives a second request (e.g., transaction request 115) to perform a second transaction that involves a second version of the base table. The first and second versions may be different versions. In response to determining that the first and second transactions each correspond to a different type of database operation (e.g., one may correspond to a DML operation 122 and the other may correspond to a DDL operation 124), the computer system may concurrently process the first and second transactions. As part of the concurrently processing, the computer system may acquire, for the second transaction, a third lock (e.g., base lock 220) on the base table and a fourth lock (e.g., proxy lock 230) on another particular proxy table that corresponds to the second version. The fourth lock may prevent the computer system from processing, while the fourth lock is held for the second transaction, another transaction to manipulate a portion of the base table associated with the second version.

In some cases, the computer system receives a second request to perform a second transaction that involves a second version of the base table. The first and second versions may be different versions. In response to determining that the first and second transactions involve the same type of database operation, the computer system may process the second transaction after completing processing of the first transaction.

In some cases, the computer system receives a second request to perform a second transaction that involves a second version of the base table. The first and second versions may be the same version. In response to determining that the first and second versions are the same, the computer system may process the second transaction after completing processing of the first transaction.

Exemplary Computer System

Figure 9:
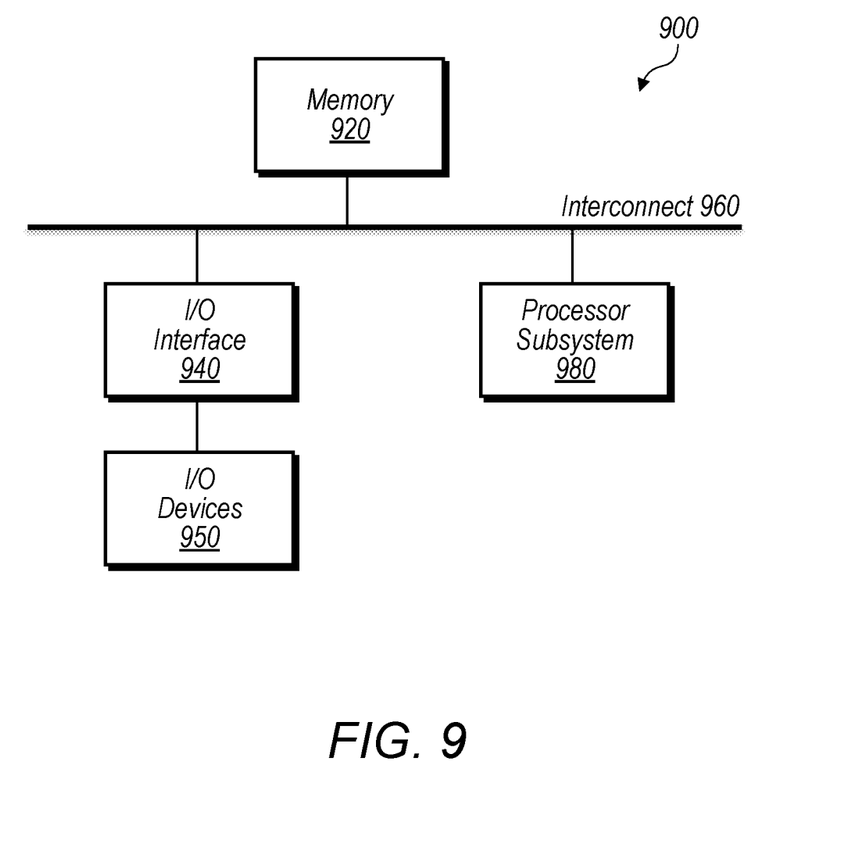
FIG. 9 is a block diagram illustrating an example computer system, according to some embodiments.

Turning now to FIG. 9, a block diagram of an exemplary computer system 900, which may implement database system 110 and/or database 130, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement application server 200, database server 300, and lock manager 310 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

maintaining, by a database system, a database table having a plurality of versions, wherein each of the versions identifies a corresponding portion of the database table that transactions associated with that version are permitted to access;

receiving, by the database system, a first request to perform a first transaction to modify a definition of the database table;

receiving, by the database system, a second request to perform a second transaction to modify data stored in the database table; and in response to determining that the first and second transactions are associated with different versions of the plurality of versions, the database system concurrently processing the first and second transactions, including acquiring for the first transaction:

a first lock on the database table to prevent the database table from being deleted while the first lock is held; and a second lock on a proxy database object corresponding to one of the plurality of versions of the database table, wherein the second lock being held on the proxy database object prevents other transactions having the same version as the first transaction from being processed against the database table, wherein a lock is acquired for the second transaction on a different proxy database object that corresponds to a different version of the database table.

2. The method of claim 1, further comprising:
in response to the determining that the database table is associated with a new version, the database system creating a new proxy database object for the new version of the database table.

3. The method of claim 1, further comprising:
in response to the database table being deleted, the database system deleting each proxy database object maintained for the plurality of versions of the database table.

4. The method of claim 1, wherein the first lock is acquired prior to the second lock.

5. The method of claim 1, wherein the second lock is acquired prior to the first lock.

6. The method of claim 1, wherein first transaction specifies a data definition language (DDL) operation for modifying the definition of the database table, wherein the method further comprises:
receiving, by the database system, a third request to perform a third transaction that specifies a second DDL operation for modifying the definition of the database table; and
sequentially processing, by the database system, the first and third transactions based on the first and third transactions each specifying a respective DDL operation, wherein the first and third transactions are associated with different versions of the plurality of versions.

7. The method of claim 1, wherein second transaction specifies a data manipulation language (DML) operation for modifying data stored in the database table, wherein the method further comprises:
receiving, by the database system, a third request to perform a third transaction that specifies a second DML operation for modifying data stored in the database table; and
sequentially processing, by the database system, the first and third transactions based on the first and third transactions each specifying a respective DML operation, wherein the first and third transactions are associated with different versions of the plurality of versions.

8. The method of claim 1, wherein modifying the definition of the database table includes adding a database trigger to be executed upon a particular condition being satisfied.

9. A non-transitory computer readable medium having program instructions stored thereon that are capable of causing a computer system to perform operations comprising:
maintaining a database table having a plurality of versions, wherein each of the versions identifies a corresponding portion of the database table that transactions associated with that version are permitted to access;
receiving a first request to perform a first transaction that identifies a data definition language (DDL) operation for modifying a definition of the database table, wherein the first transaction is associated with a first version of the plurality of versions;
receiving a second request to perform a second transaction that identifies a data manipulation language (DML) operation for modifying data stored in the database table, wherein the second transaction is associated with a second, different version of the plurality of versions; and
in response to determining that the first and second transactions are associated with different versions of the plurality of versions, concurrently processing the first and second transactions, wherein the processing includes:
acquiring, for the first transaction, a first lock on a first lockable database object corresponding to the first version, wherein the first lock being held on the first lockable database object prevents other transactions having the same version as the first transaction from being processed against the database table; and
acquiring, for the second transaction, a second lock on a second lockable database object corresponding to the second version.

10. The medium of claim 9, wherein the operations further comprise:
prior to completing the processing of the first and second transactions, receiving a third request to perform a third transaction that is associated with the first version; and
processing the third transaction subsequent to the first lock being released, wherein the first lock corresponds to the first version.

11. The medium of claim 9, wherein the concurrent processing of the first and second transactions is performed in response to determining that the first and second transactions are associated with different types of database operations.

12. A method, comprising:
maintaining, by a database system, a base table having a plurality of versions, wherein each of the versions identifies a corresponding portion of the base table that transactions associated with that version are permitted to access;
maintaining, by the database system, a proxy table for each of the plurality of versions;
receiving, by the database system, a request to perform a first transaction that involves a first version of the base table; and
processing, by the database system, the first transaction, wherein the processing includes acquiring, for the first transaction:
a first lock on the base table, wherein the first lock permits the database system to process, while the first lock is held for the first transaction, another transaction to manipulate a portion of the base table associated with a different version than the first version; and
a second lock on a particular proxy table that corresponds to the first version, wherein the second lock prevents the database system from processing, while the second lock is held for the first transaction, another transaction to manipulate a portion of the base table associated with the first version.

13. The method of claim 12, further comprising:
receiving, by the database system, a second request to perform a second transaction that involves a second version of the base table, wherein the first and second versions are different versions; and
in response to determining that the first and second transactions each correspond to a different type of two types of database operations, the database system concurrently processing the first and second transactions, wherein the two types of database operations include a data manipulation language (DML) operation type and a data definition language (DDL) operation type, and wherein the concurrently processing includes acquiring, for the second transaction:

a third lock on the base table; and a fourth lock on another particular proxy table that corresponds to the second version, wherein the fourth lock prevents the database system from processing, while the fourth lock is held for the second transaction, another transaction to manipulate a portion of the base table associated with the second version.

14. The method of claim 12, further comprising:

receiving, by the database system, a second request to perform a second transaction that involves a second version of the base table, wherein the first and second versions are different versions; and in response to determining that the first and second transactions involve the same type of database operation, the database system processing the second transaction after completing processing of the first transaction.

15. The method of claim 12, further comprising:

receiving, by the database system, a second request to perform a second transaction that involves a second version of the base table wherein the first and second versions are the same version; and in response to determining that the first and second versions are the same, the database system processing the second transaction after completing processing of the first transaction.

16. The method of claim 12, wherein the first version identifies one or more fields of the base table that are not identified by a second version of the plurality of versions.

* * * * *